Dec. 31, 1968     P. M. PIFER     3,419,867
AUTOMATIC TRACKING SYSTEM UTILIZING CODED SCAN RATE
Original Filed Oct. 18, 1966     Sheet 1 of 2

INVENTOR.
PETER M. PIFER
BY
Cushman, Darby & Cushman
ATTORNEYS

SINUSOIDAL FM

SAWTOOTH FM

PSUEDO RANDOM

INVENTOR.
PETER M. PIFER

United States Patent Office 3,419,867
Patented Dec. 31, 1968

3,419,867
AUTOMATIC TRACKING SYSTEM UTILIZING
CODED SCAN RATE
Peter M. Pifer, Atlanta, Ga., assignor to Scientific-Atlanta,
Inc., Atlanta, Ga., a corporation of Georgia
Continuation of application Ser. No. 587,608, Oct. 18,
1966. This application Feb. 21, 1968, Ser. No. 707,335
6 Claims. (Cl. 343—113)

ABSTRACT OF THE DISCLOSURE

Disclosed in this application is an antenna tracking system in which the antenna beam is modulated as a measure of the deviation of the line-of-sight to the target from the boresight axis of the antenna in such a continually changing coded manner as to make that modulation distinguishable from other modulation, including extraneous signals, present on the incoming signal received by the antenna. The antenna beam is moved in accordance with a coded scan control signal whose scan rate varies. That is, the rate of scan is coded. The same coded control signal is correlated with the signal that is received by the antenna, to distinguish the deviation measuring signal in order that the signal only is employed to derive antenna pointing-error signals which are therefore free of the other modulation received by the antenna.

---

This is a continuation of application Ser. No. 587,608, filed Oct. 18, 1966, and now abandoned.

This invention has application in any tracking antenna system incorporating electronic means of scanning, switching, or lobing the antenna beam to impart a modulation to the signal received from the target, the modulation constituting a measure of the deviation of the line-of-sight to the target from the boresight axis of the antenna. In particular, the purpose of the invention is to make the modulation thus imparted distinguishable from other modulation present on the incoming signal received by the antenna, and to detect the scan-generated modulation only so as to derive antenna pointing-error signals that are not affected by such other modulation.

Further, this invention relates to an improvement of the invention disclosed by L. Clayton, Jr., in the patent application "Scan Automatic Tracking System Utilizing Coded Scan Sequence," Ser. No. 719,265, filed Apr. 5, 1968, and which is a continuation of Ser. No. 587,528, filed Oct. 18, 1966, now abandoned.

Tracking antenna systems can be classified broadly into the following categories:

(a) Mechanically scanning or lobing antenna systems, such as the widely used conical-scan type, which impart boresight-error modulation to the signal, employ a single-channel receiver, and derive pointing-error signals from the detected envelope of the modulated signal.

(b) "Monopulse" or "simultaneous lobing" systems which have a nonscanning antenna, employ a multiple-channel receiver to process the principal signal and one or two error signals provided by multiple ports of the antenna, and derive pointing-error signals by synchronous detection of the error-channel IF signals using the principal-channel IF signal as a reference.

(c) Electrically scanning or lobing antenna systems which impart a boresight-error modulation to the signal, employ a single-channel receiver, and derive pointing-error signals from the detected envelope of the modulated signal. Such a system may consist of an antenna of any of the types suitable for use in a monopulse system, an electronic scanning device, and a single-channel receiver of any of the types suitable for use in a conical-scan system. The electronic scanning device may incorporate means of switching, amplitude modulating, or phase shifting the signals from the antenna error ports and combining them with the principal signal so as to produce a composite signal similar to that produced by mechanical scanning or lobing.

Mechanically scanning antennas are subject to wear, require maintenance, and are normally limited to scan rates of 30/sec. or lower. Their most serious limitation in many applications is that the boresight-error modulation they produce is indistinguishable from modulation present upon the incoming signal due to multipath propagation interference phenomena, spinning or other motion of the target, or intentional jamming. Such modulation having frequency components near the scan rate causes spurious pointing-error signals which result in degraded performance or loss of track.

Monopulse systems overcome these difficulties, but the required multichannel receiver is complex and expensive, and is difficult to adjust and maintain because of the necessity for precise phase stability and automatic-gain-control tracking among channels.

Electrically scanning systems overcome the mechanical disadvantages of scanning antennas while retaining the simplicity of a single-channel receiver. They suffer the same limitation of sensitivity to spurious modulation. Their performance is generally superior to that of mechanical systems, however, because the scan rate can be made high compared to the predominant frequencies encountered from spin modulation and multipath effects. Nevertheless, the scan rate is often required to be lower than information-bearing modulation frequencies present in the signal, and the complex periodic modulation produced by target spin can have significant harmonic content in the region of a few hundred hertz. Even when not so severe as to cause loss of track, beat phenomena cause cyclic tracking errors.

It is a primary object of this invention to provide a scanning pattern which is coded, and thus provides coding of the error-signal modulation to make it noncoherently related to modulation which might be present on the incoming signal.

A brief description of an illustrative embodiment of the invention will now be given:

The automatic tracking antenna shown could be any antenna using electronic means of generating an amplitude-modulated RF signal whose amplitude modulation is related to the off-boresight angle. The RF signal is normally (but not necessarily) amplified and detected by an AM receiver. The detected signal is in an AC form, containing error signals correlated with the coded scan drive signal, and also containing other signals corresponding to the amplitude modulation on the incoming RF signal. The AC error signal is converted to a DC error signal in a cross-correlation detector which uses as reference the scan drive signal. The detector will be nonresponsive to signals other than those that have significant correlation with the scan drive signal.

The preferred approach is to cause the rate of repetition of the scan cycle to vary. That is, the scan rate is coded rather than the scan sequence, as is done in the before-mentioned copending application. The scan code generator varies the scan frequency rapidly in a cyclic or random manner, executing a pattern of scan frequency variation in a time that is short in comparison with the response time of the antenna servo.

Another object of this invention is to make an electrically scanning tracking antenna system almost completely immune to disturbance from amplitude modulation of the incoming signal, without substantial increase in cost or complexity.

A further object of this invention is the use of a coded scan rate in an automatic tracking system, in combination with a pointing-error detector that is nonresponsive to signals other than those that have significant correlation with the scan drive signal.

Still other objects will be in part apparent and in part pointed out specifically hereinafter in connection with the drawings that follow, and in which.

Figure 1:
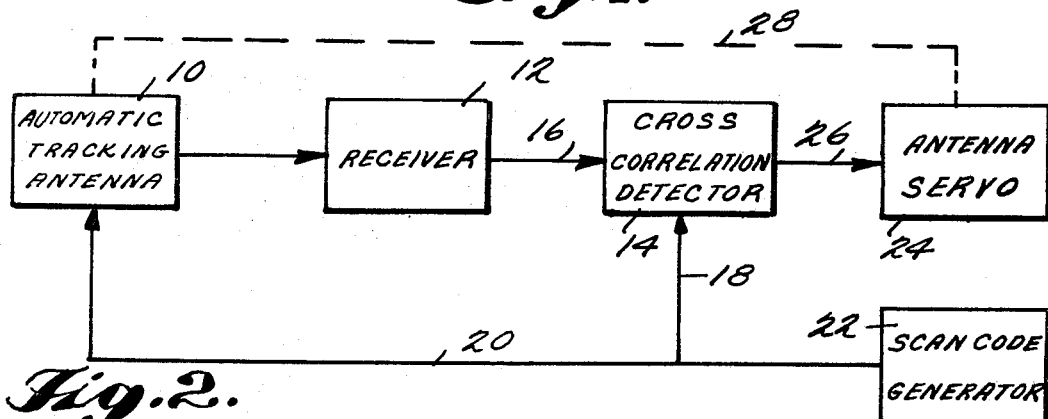
FIGURE 1 is a block diagram of an illustrative embodiment of the invention.

Referring to FIGURE 1 there is shown an overall block diagram of the system. The tracking antenna is indicated at 10, the radio frequency signal being received by this antenna. The magnitude of the modulation developed by the tracking antenna corresponds to the deviation of the line-of-sight to the target from the boresight axis of the antenna.

The signal is applied to receiver 12 where the modulation is detected and then applied to cross-correlation detector 14 via line 16. Also applied to cross-correlation detector 14 over line 18 is a coded signal from scan rate code generator 22. The coded signal is also applied over line 20 to antenna 10 to vary the scan rate of the antenna beam in a pseudo-random manner as will be described in more detail hereinafter.

The output of the cross-correlation detector is a direct current error signal which is applied to antenna servo-mechanism 24 over line 26. The magnitude of this error signal depends ideally only on the deviation of the line-of-sight to the target from the boresight axis of the antenna 10. However, the error signal could be affected by various extraneous sources such as multipath propagation interference phenomena, spinning or other motion of the target, or intentional jamming. The manner by which erroneous components from these extraneous sources are removed from the error signal on line 16 will be described in more detail hereinafter. The error signal on line 26 may control antenna servo-mechanism 24 so that the deviation of the target from the boresight axis is minimized by appropriate means as indicated at 28.

Figure 2:
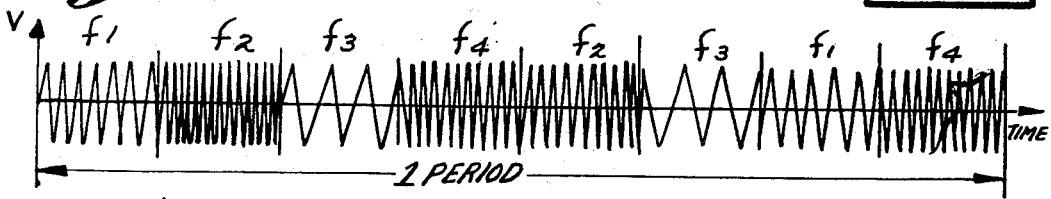
FIGURE 2 is a graph illustrating one type of coded waveform employed in the invention.
Figure 5:
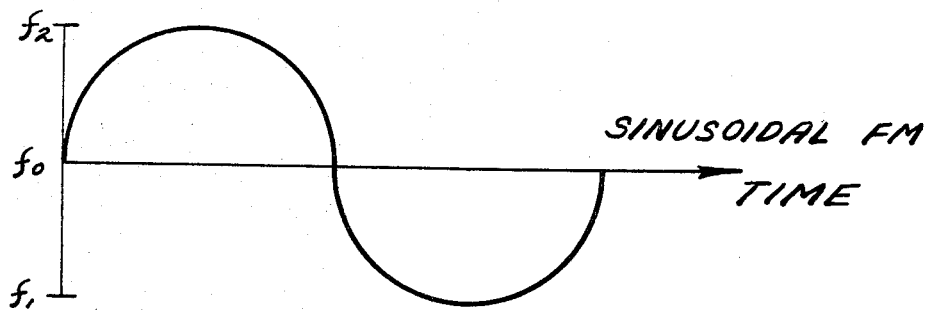
FIGURES 5, 6, and 7 are graphs which illustrate various alternative coding waveforms which may be employed in the invention rather than that shown in FIGURE 2.
Figure 6:
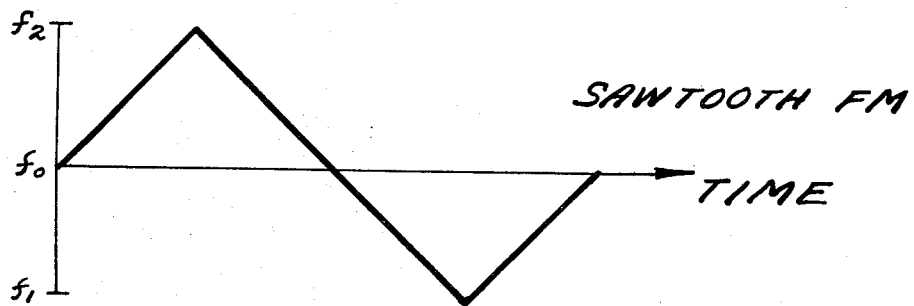
Figure 7:
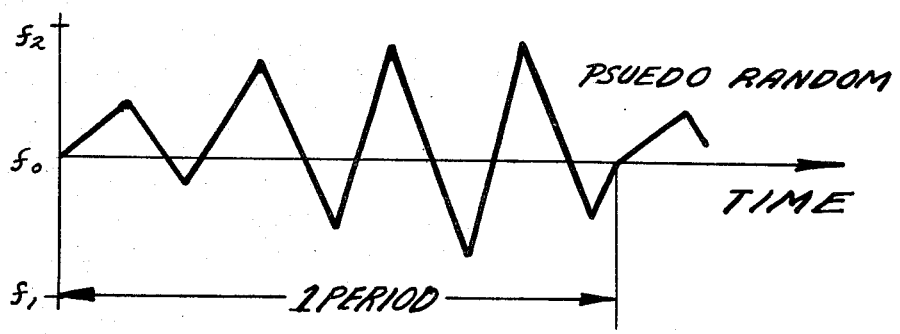

Having now described in general terms the structure required for the accomplishment of the objects of this invention a description of operation thereof will now be given. Reference should be made to FIGURE 2 which graphically illustrates one method of changing the output frequency of code generator 22 with time. Other methods are shown in FIGURES 5, 6, and 7 and will be described hereinafter. The beam scan rate of antenna 10 is the same as frequency of the coded signal and, therefore, it changes with time in the same manner as the coded signal.

As indicated in FIGURE 2 the change of output frequency is periodic. In light of this periodicity the change of output frequency is pseudo-random as opposed to purely random. However, it would, of course, be within the scope of one having ordinary skill in this art to employ a pure random signal generator for scan code generator 22 rather than the pseudo-random generator which is described in this embodiment of the invention.

The output signal from code generator 22 thus corresponds to the signal shown in FIGURE 2. This signal is applied to automatic tracking antenna 10 to change the scan rate thereof with respect to time. By this changing the scan rate, the frequency of the off-boresight deviation amplitude modulation introduced on the signal received from the target is accordingly changed. As stated hereinafter, various sources could introduce extraneous amplitude modulation which can impair the accuracy of the error signal or deviation measurement on line 26. However, due to the pseudo-random nature of the frequency change imparted to the off-boresight modulation on the received signal by scan code generator 22, there is very little or no correspondence between the imparted deviation frequency and the frequencies of the extraneous sources. Thus, if the frequency of a particular extraneous source is 300 hertz, the imparted frequency is 300 hertz for a relatively short time, compared to the total period shown in FIGURE 2, and thus the output of cross correlation detector 14 reflects the 300 hertz of the extraneous source for only a small portion of the total period indicated in FIGURE 2. Hence, the effect of the extraneous source is minimized.

The amplitude demodulated signal on line 16 contains frequency components due to (1) the off-boresight deviation frequency changes imparted by the tracking antenna 10 and the code generator 22 and (2) various undesired signals introduced by different sources extraneous to the tracking system. The output of cross-correlation detector line 26 is maximized when the frequency of the signals on lines 16 and 18 is identical. Thus, the smaller the deviaiton of the frequency of the signal on line 16 from the frequency of the signal on line 18, the greater the signal appearing on line 26. Thus, the frequency component of the demodulated signal on line 16 corresponding to the off-boresight deviation will result in a maximized direct current error signal on line 26 whereas the frequency components of the demodulated signal on line 16 due to the various extraneous sources will cause minimal output on line 26 due to the noncorrelation in frequency of these extraneous signals to the frequency of the signal on line 18. The optimum frequencies of the signal on line 18 could be determined by making a statistical study of the expected frequencies of the various possible extraneous sources and then choosing the frequencies of the signal on line 18 to correlate as little as possible with these expected frequencies. Typically, the frequencies of these extraneous sources are from 0 to 30 hertz. Since the frequency of the scan rate preferably varies between 200 and 400 hertz, the fundamental frequency of a 30-hertz interfering source is effectively removed. However, since the harmonic frequencies of the 30-hertz source and other extraneous sources may occur between 200 and 400 hertz, this invention insures that these additional signals will introduce little, if any, error into the system.

Figure 4:
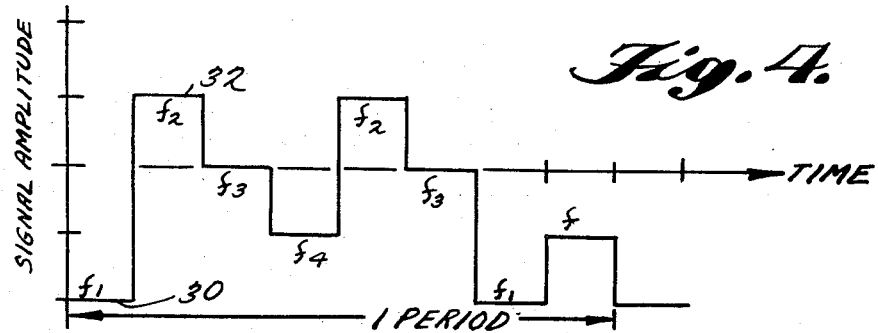
FIGURE 4 is a graph illustrating a waveform which occurs within the diagram of FIGURE 3.
Figure 3:
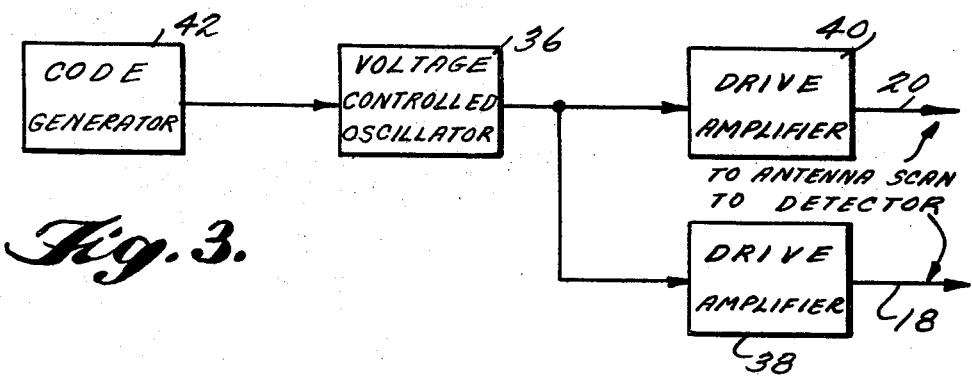
FIGURE 3 is a block diagram illustrating one embodiment for generating the waveform shown in FIGURE 2.

In FIGURE 3 there is shown in block diagram form a preferred arrangement for deriving the signals occurring on lines 18 and 20 of FIGURE 1. Thus the output of generator 42 as shown in FIGURE 4 is applied to voltage controlled oscillator 36, the frequency of the output of which varies in accordance with the amplitude of the signal applied thereto. Hence, referring to FIGURES 2 and 4, the frequency of the output of oscillator 36 for portion 30 of the generator 42 output signal would be some frequency $f_1$; whereas the frequency of the output of oscillator 36 would be some frequency $f_2$ for portion 32 of the code generator output signal and so forth. The output signal from oscillator 36 is applied to driver amplifiers 38 and 40 which are respectively connected to lines 18 and 20 of FIGURE 2.

Reference should now be made to FIGURES 5, 6, and 7 which show various waveforms representing changes of frequency with respect to time of the signal applied from scan rate code generator 22 of FIGURE 1. The waveforms shown in FIGURE 2 correspond to a step change in the frequency with respect to time, whereas the change in frequency with respect to time in FIGURE 5 is sinusoidal, FIGURE 6 is triangular, and FIGURE 7 is also triangular, the width of the triangular waveform in FIGURE 7 varying while in FIGURE 6 the width remains constant.

The waveform of FIGURE 5 would naturally be the easiest to implement since the signal output from code generator 22 in FIGURE 3 is merely sinusoidal thereby causing the sinusoidal change in frequency at the output of oscillator 36, as shown in FIGURE 5. Thus, the waveform of FIGURE 5 is preferred when simplicity of construction and economy of cost are the main prerequisites of the system.

However, a more complicated waveform, such as that of FIGURE 7, is quite often preferred. For instance, the operation of a tracking system in the presence of a jamming signal would require the use of waveform shown in FIGURE 7 as opposed to that shown in FIGURE 5. Although this would affect to some extent the complexity of the equipment, this added complexity is justified in light of the need to overcome the effect of the jamming signal.

Still numerous modifications of the invention would become apparent to one of ordinary skill in the art upon reading the foregoing disclosure. During such a reading, it would be evident that this invention has provided unique apparatus for accomplishing the objectives and advantages herein stated. It is to be understood, however, that this foregoing disclosure is to be considered exemplary and not limitative, the scope of the invention being defined by the following claims.

I claim:

1. Apparatus for reducing the effects of various extraneous modulation of a signal received from a target in tracking systems which include means for scanning, switching or lobing an antenna beam and thereby imparting deviation modulation to the signal received from the target which is a measurement of the deviation of the line-of-sight to the target from the boresight axis of the antenna, said apparatus comprising:
    antenna means for receiving said signal and imparting said deviation modulation,
    means for imparting a frequency change to said deviation modulation,
    and detector means responsive to both the modulation on said received signal and to said frequency change for developing said deviation measurement, whereby the correspondence between said deviation measurement and the imparted deviation modulation is maximized due to the correlation of said imparted frequency change and said deviation modulation and the said effects of various extraneous modulation are minimized due to noncorrelation with said imparted frequency change.

2. Apparatus for reducing the effects of various extraneous modulation of a signal received from a target in tracking systems which include means for scanning, switching or lobing an antenna beam and thereby imparting deviation modulation to the signal received from the target which is a measurement of the deviation of the line-of-sight to the target from the boresight axis of the antenna, said apparatus comprising:
    antenna means for receiving said signal and imparting said off-boresight deviation modulation including means for moving the direction of maximum sensitivity of said antenna means,
    means for changing the rate of moving said direction of maximum sensitivity and thereby imparting a frequency change to said deviation modulation,
    and detector means responsive to both the modulation on said received signal and to the changing rate of moving said direction of maximum sensitivity for developing said deviation measurement,
    whereby the correspondence between said deviation measurement and the imparted deviation modulation is maximized due to the correlation of the said imparted frequency change and said deviation modulation and the said effects of various extraneous modulation are minimized due to noncorrelation with said imparted frequency change.

3. Apparatus as set forth in claim 2 wherein said means for changing the rate of moving said direction of maximum sensitivity includes means for generating a coded control signal which is applied to said means for moving the direction of maximum sensitivity.

4. Apparatus as set forth in claim 3 wherein said means for generating a coded control signal includes means for changing the frequency of said control signal pseudo-randomly.

5. Apparatus as in claim 4 where the means for changing the frequency of the pseudo-random control signal includes means for generating a signal which varies in amplitude pseudo-randomly and oscillator means responsive to said amplitude varying signal to generate said frequency changing signal.

6. Apparatus as set forth in claim 2 including means responsive to said deviation measurement for reducing said deviation.

References Cited

UNITED STATES PATENTS 2,969,541   1/1961   Seaman _____ 343—120

RODNEY D. BENNETT, *Primary Examiner.*

R. E. BERGER, *Assistant Examiner.*

U.S. Cl. X.R.

343—100, 117, 118

Disclaimer 3,419,867.—*Peter M. Pifer*, Atlanta, Ga. AUTOMATIC TRACKING SYSTEM UTILIZING CODED SCAN RATE. Patent dated Dec. 31, 1968. Disclaimer filed Aug. 18, 1975, by the assignee, *Scientific-Atlanta, Inc.*

Hereby disclaims the entire term of said patent.

[*Official Gazette February 10, 1976.*]